United States Patent [19]

Anderson

[11] Patent Number: 4,566,678

[45] Date of Patent: Jan. 28, 1986

[54] POLYMERIC APPARATUS AND METHOD OF MAKING THE SAME

[75] Inventor: David G. Anderson, Chesterton, Ind.

[73] Assignee: Miner Enterprises, Geneva, Ill.

[21] Appl. No.: 412,119

[22] Filed: Aug. 27, 1982

[51] Int. Cl.[4] .................. B60F 11/00; B29C 17/00
[52] U.S. Cl. .................. 267/141.1; 264/249; 264/301; 301/63 PW
[58] Field of Search ............. 264/294, 295, 296, 235, 264/346, 320, 322, 325, 326, 249; 267/153, 140, 63 R, 141, 141.1; 213/7, 22; 301/5.3, 63 PW

[56] References Cited

U.S. PATENT DOCUMENTS

| | | | |
|---|---|---|---|
| 3,315,951 | 4/1967 | Boschi et al. | 267/153 |
| 3,409,284 | 11/1968 | Rix | 267/153 |
| 3,558,764 | 1/1971 | Isaacson et al. | 264/346 |
| 3,584,858 | 6/1971 | Beck | 267/153 |
| 3,608,044 | 9/1971 | Coplan et al. | 264/346 |
| 3,677,535 | 7/1972 | Beck | 267/153 |
| 3,845,021 | 10/1974 | Dukes et al. | 213/7 |
| 4,073,858 | 2/1978 | Chung | 213/7 |
| 4,090,283 | 5/1978 | Wooley | 301/5.3 |
| 4,198,037 | 4/1980 | Anderson | 264/235 |
| 4,235,427 | 11/1980 | Bialobrzeski | 267/63 R |

Primary Examiner—Willard E. Hoag
Attorney, Agent, or Firm—Wood, Dalton, Phillips, Mason & Rowe

[57] ABSTRACT

A method of producing useful hollow bodies and the resulting products. The hollow bodies are formed by providing a block of thermoplastic elastomer material having a selected initial axial height and providing the block with a selected axial core opening. An axial force is applied to said block sufficient to compress said block a substantial extent to reduce the free height of the block and expand the core opening transversely outwardly to define sidewalls for the hollow body. The axial force is removed, and the hollow body is prepared for use as a compression spring or other useful device.

34 Claims, 14 Drawing Figures

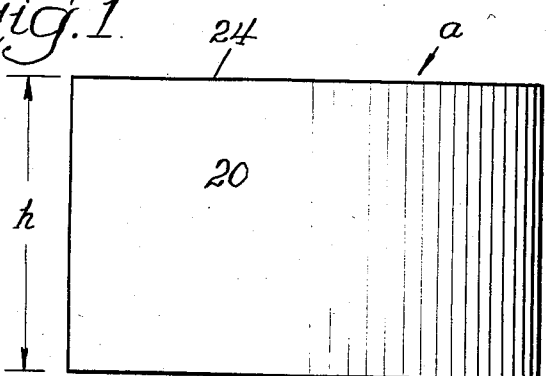
Fig.1.
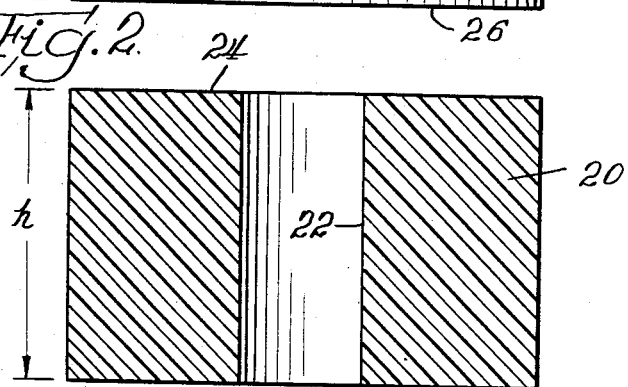
Fig.2.
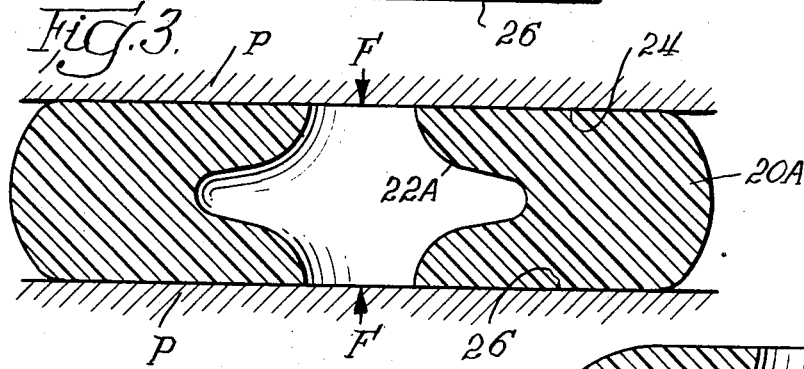
Fig.3.
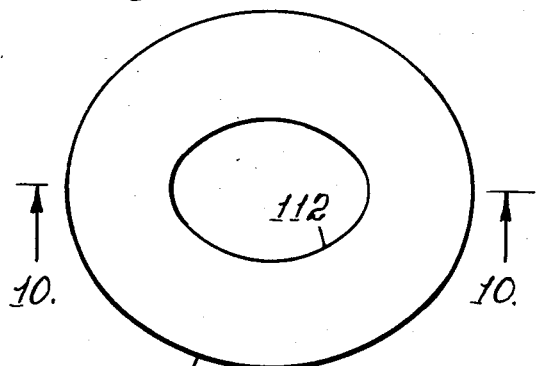
Fig.9.
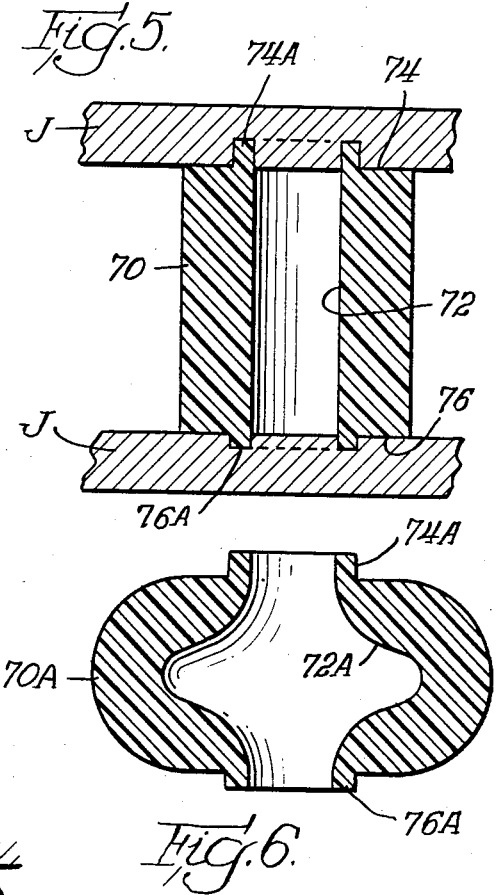
Fig.5.
Fig.6.
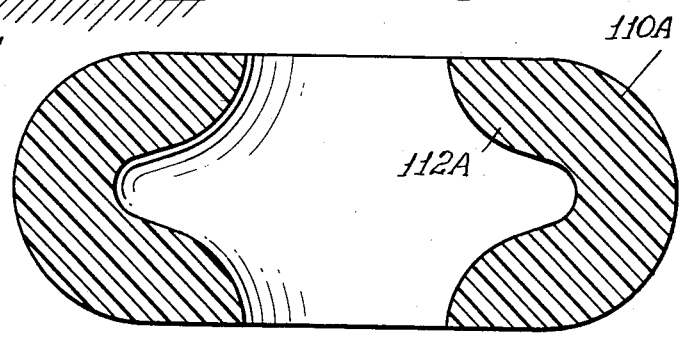
Fig.10.
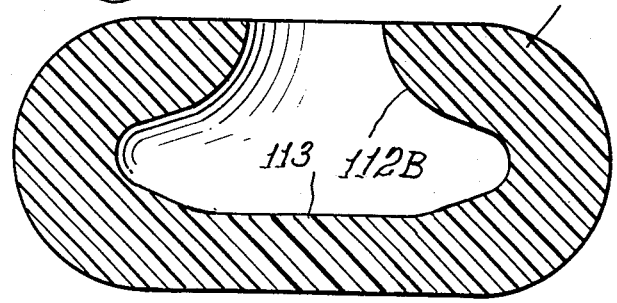
Fig.11.

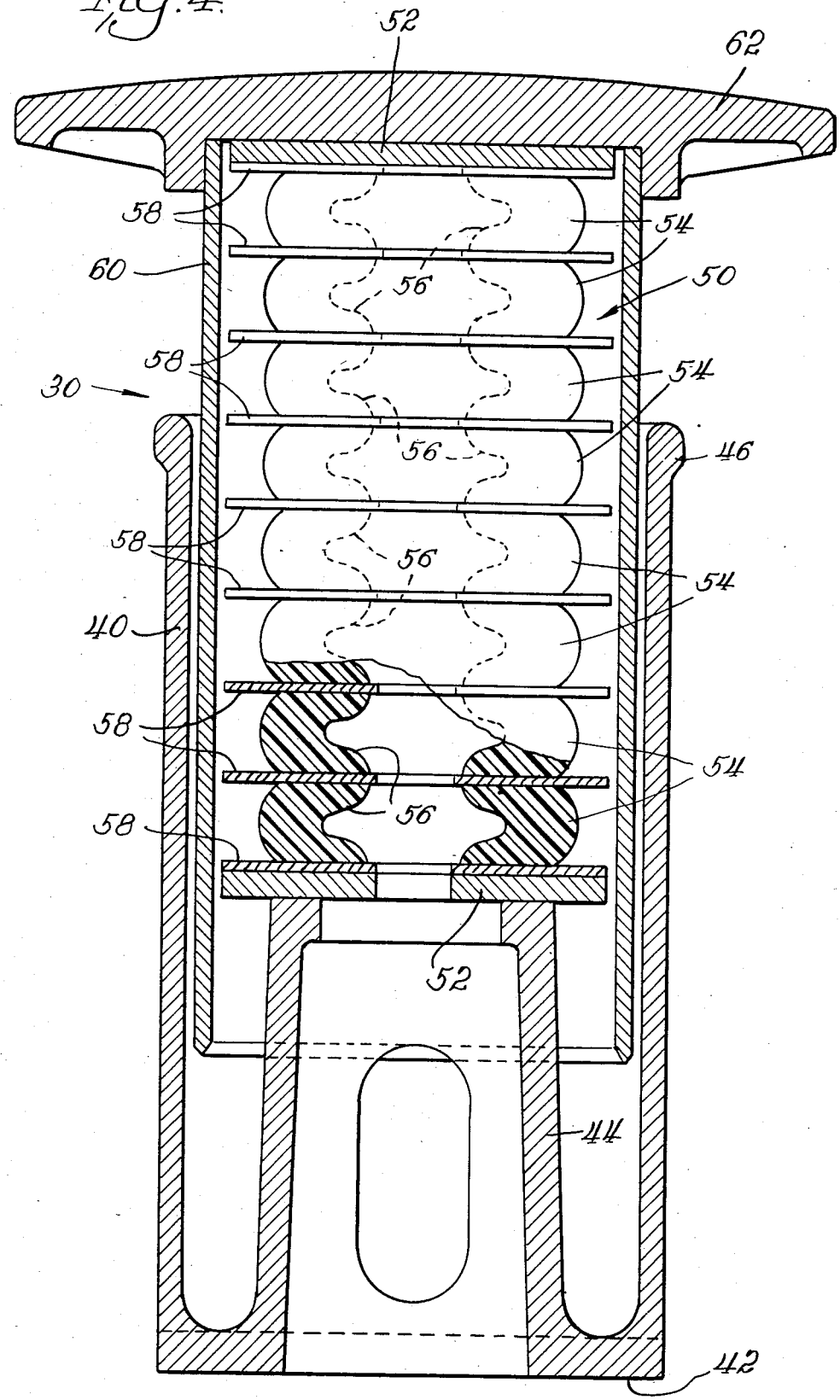

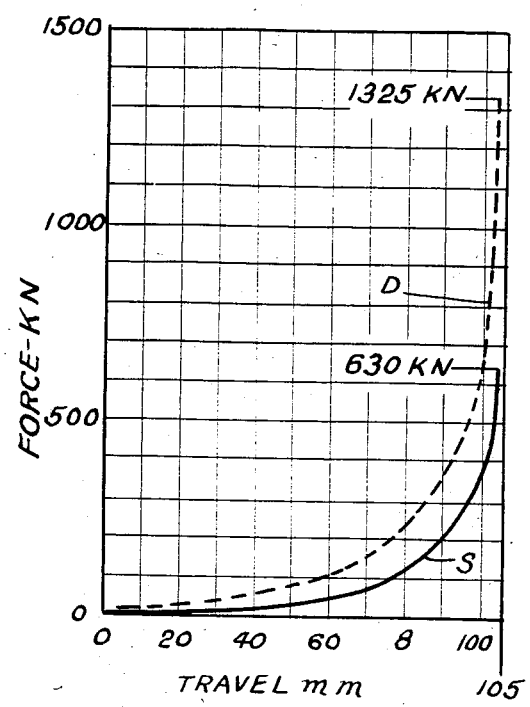
Fig. 12. RUBBER SPRINGS
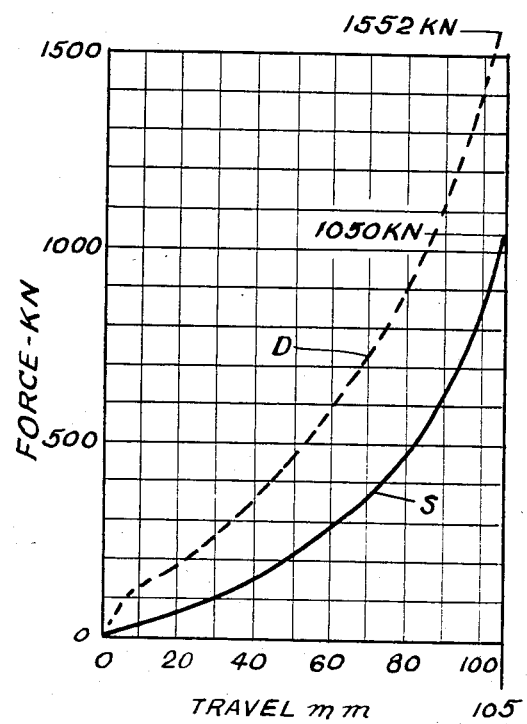
Fig. 13. POLYMER SPRINGS
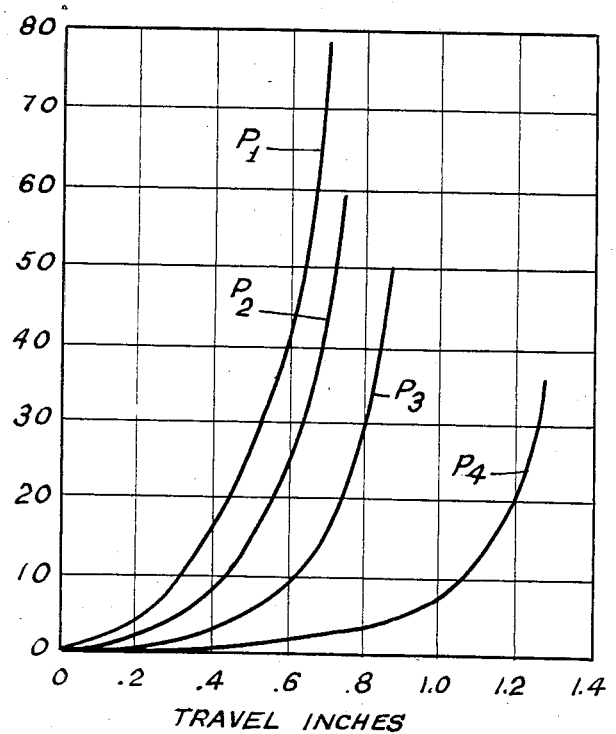
Fig. 14. POLYMER SPRINGS WITH DIFFERENT HOLLOW CORES

POLYMERIC APPARATUS AND METHOD OF MAKING THE SAME

BACKGROUND AND GENERAL DESCRIPTION

This invention relates generally to an improved method of making useful hollow bodies of thermoplastic material, and more particularly relates to making hollow bodies from copolyester polymer elastomer material, and the products resulting therefrom.

As discussed in U.S. Pat. No. 4,198,037, issued on Apr. 15, 1980 to the assignee of the present application, elastomers have been widely used in the past for various products, including springs. One of the more recent useful thermoplastic elastomers is a copolyester polymer elastomer such as sold by E. I. duPont de Nemours & Co. of Wilmington, Del., under the trademark HYTREL. As explained in said patent, HYTREL is made from three ingredients, namely, diemethyl terephthalate; polyglycols such as polytetramethylene ether glycol, polyethylene ether glycol or polypropylene ether glycol; and short chain diols like butanediol and ethylene glycol. Generally, this product can be used to form thermoplastic elastomeric products. Similar elastomers may be produced and sold by others.

Generally, this type of polymer elastomer material has inherent physical properties that make it unsuitable for use as a compression spring. However, the recently issued patent referred to above describes a method by which the copolyester polymer elastomer material can be treated for rendering the material usable as a compression spring. Generally, that treatment, to convert the elastomer into compression spring material, comprises the application of a compressive force to a body of material which compresses the body in an axial direction to an extent greater than 30% of its previous axial length, measured in the direction of the applied pressure.

In continuing with the experimentation and development of the compression spring material disclosed in said patent, it has been found in accordance with the present invention that a physical modification to the elastomer block before the application of a compressive force thereto has an appreciable and unexpected effect on the physical characteristics, function and utilization of the final elastomer product. Generally, it has been found pursuant to this invention that the provision of a central core or opening in the copolyester polymer elastomer body, before the application of an axial compressive force to the body, has substantial beneficial effects on the resultant product. The use of the resulting hollow elastomer body as a compression spring is enhanced by changing the spring characteristics of the body and enlarging the scope of applications where such a spring can be utilized. The invention allows the physical characteristics of the hollow body to be varied easily to accommodate the loads and deflections needed in particular spring applications. Elastomer springs with various spring rates thus can be easily produced by using this invention. The resulting hollow elastomer body also possesses characteristics which make it useful in applications other than as a compression spring.

The provision of a core opening extending at least partially through the elastomer body before the application of a compression force has been found not to cause the sidewalls of the body to collapse, as may be expected. Rather, the sidewalls of the body and the core opening expand outwardly in a transverse direction as a result of the application of the compressive force to the body. The resulting sidewalls are generally uniform in thickness and symmetrical about the axial center-line of the core opening and the core opening has been greatly enlarged to define an essentially hollow body from the elastomer material. The presence of the core thereby changes the physical characteristics of the elastomer body.

The functional characteristics of the elastomer body are also changed by compressing the material with a core opening extending at least partially therethrough. When the body is utilized as a compression spring, the spring characteristics of the hollow body have been changed, compared to a solid body of the same material. The spring rate is changed, and the amount of dynamic and static energy which can be stored by the spring has been varied. The functional characteristics of the hollow elastomer bodies produced pursuant to this invention thus expands the flexibility of design and the scope of application for spring units utilizing copolyester polymer elastomer materials.

Moreover, the operating characteristics of the hollow elastomer body produced by this invention can be varied in a simple manner by changing the shape and size of the core opening provided in the body before compression. For example, if a lighter spring with a higher spring deflection rate per unit load is desired, the size of the core opening can be enlarged to correspondingly reduce the thickness of the resulting sidewalls of the hollow body. Similarly, a stiffer spring can be produced by selecting a smaller core opening so that the increased sidewall thickness produces a stiffer spring. The shape of the elastomer body, as well as the shape of the central core opening can also be varied to suit particular applications. For example, the body can be cylindrical, oval, generally rectangular or square in configuration. The core opening likewise can be circular, oval, rectangular or square in cross-section. In the preferred embodiment the transverse shape of the core opening and the body are similar and co-axial, so that the symmetry of the body is maintained.

In addition, the hollow bodies in accordance with this invention are simple and economical to produce, compared to hollow bodies made by prior techniques. Instead of requiring expensive and cumbersome cores or internal machining to produce a hollow opening in a body, the present invention requires only the provision of a core opening in the elastomer body prior to compression. This opening easily can be drilled into or through the body with conventional drilling equipment. Alternately, if the elastomer body is to be molded, the central opening can be molded into the body prior to compression. If the initial elastomer body is to be cylindrical, for example, a simple pipe section can be used for the mold for the body as well as for the core opening.

Also, relatively minor modifications in the jigs and fixtures used to produce the hollow bodies will result in variations in the shape of the final product. For example, the jigs and fixtures used to shape the hollow body can be arranged to provide one or both axial ends of the body with a reduced collar or neck portion which could be used to mount and position the body in particular industrial applications. Similarly, the jigs and fixtures can be arranged so that the final core opening extends only partially through the body. One axial end of the body will thereby be provided with a solid end wall that is desirable for particular applications.

The hollow elastomer bodies produced in accordance with this invention also can be designed and used for purposes other than industrial compression springs. They are useful for example, as isolation and vibration dampers, such as in motor mount applications. They are also useful as energy absorption bumpers or cushions. The hollow elastomer bodies produced pursuant to the invention also have sufficient symmetry about their axial dimensions to be utilized in various applications as rollers or wheels.

DESCRIPTION OF ILLUSTRATIVE EMBODIMENTS

Further advantages and features of the present invention will become more apparent from a description of several embodiments thereof taken in conjunction with the accompanying drawings in which:

FIG. 1 is a front elevational view of a cylindrical block of copolymer polyester elastomer material which can be used to produce a hollow elastomer body in accordance with this invention;

FIG. 2 is a front cross-sectional elevational view of the elastomer body shown in FIG. 1, illustrating a central axial core opening provided in the body, and also illustrating the condition of the body before the application of an axial compressive force;

FIG. 3 is a cross-sectional front elevational view of the elastomer body shown in FIGS. 1 and 2 depicted in the process of having an axial compressive force applied to the body pursuant to this invention;

FIG. 4 is a cross-sectional front elevational view of a freight and locomotive buffer including a compression spring assembly formed from a stack of hollow elastomer bodies produced pursuant to this invention;

FIG. 5 illustrates a modification of the invention wherein the hollow body is provided with a reduced neck portion at both axial ends, and a central core opening, shown before a compression force is applied and further showing the body positioned between compression members;

FIG. 6 is a cross-sectional elevational view of the modified hollow body shown in FIG. 5 after the application of a compressive force to the body;

FIG. 9 illustrates a further modification of a hollow elastomer body in accordance with this invention where the body and the central opening are oval in horizontal cross-section;

FIG. 10 is a cross-sectional elevational view of the oval elastomer body shown in FIG. 9, taken along the major axis depicted by the line 10—10 in FIG. 9 after the body is subjected to the compressive force in accordance with this invention;

FIG. 11 is a cross-sectional elevational view of a modified oval body after compression, showing the final configuration of the oval body when the core opening extends only partially through the body so that a solid wall is formed at one axial end;

FIG. 12 is a force-travel diagram illustrating the results of static and dynamic tests on a rubber elastomer body having the general configuration of the body illustrated in FIG. 1;

Figure 7:
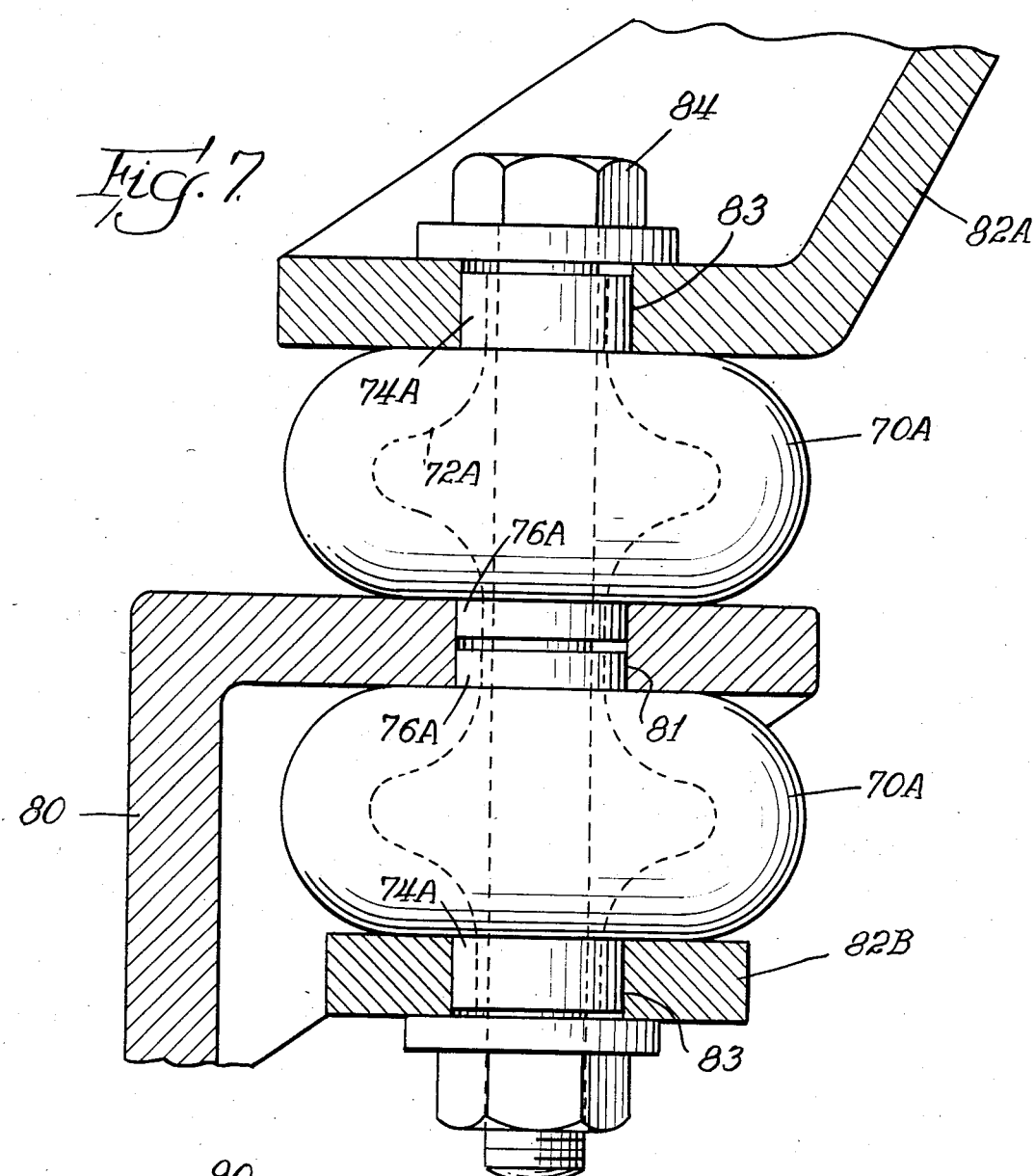
FIG. 7 is a partial cross-sectional elevational view of a motor mount assembly utilizing a pair of aligned hollow spring bodies conforming to the modified embodiment shown in FIGS. 5 and 6.

FIG. 13 is a force-travel diagram illustrating the results of static and dynamic tests on a hollow copolyester polymer elastomer body pursuant to this invention having the general configuration of the body illustrated in FIG. 1; and FIG. 14 is a force-travel diagram comparing the results of applying a selected compressive force to cylindrical bodies of copolyester polymer elastomer having the same initial size and shape but having a central core of varying sizes.

The method of producing improved elastomer bodies pursuant to this invention will be described initially by reference to the cylindrical form of hollow body illustrated in FIGS. 1-3. As shown therein, a cylindrical body 20 of copolyester polymer elastomer material has a selected initial axial height 'h' and a circular transverse cross-sectional area 'a'. As shown in FIG. 2, the body 20 is also provided with a central core opening 22. The core 22 may be a drilled circular opening which extends axially through the body 20 from the top end wall 24 of the body to the bottom end wall 26. Pursuant to this invention, the body 20 having the core opening 22 is placed within a suitable compression jig, such as illustrated by the plates P in FIG. 3.

As explained in said patent, the block of polymer in the preferred embodiment is then annealed. The annealing time could extend to about one-hundred and eighty hours for particular applications. Next, an axial force 'F' is applied to the body 20 to compress the body a selected axial extent. The force 'F' should be sufficient to compress the elastomer body 20 at least 30% of its initial axial height 'h'. The optimum results occur when the force 'F' compresses the body 20 by approximately 50% of its initial height 'h'. An operative range of forces would cause compression in the range of 30% to about 80% of the original axial height 'h' of the body 20. As explained further in U.S. Pat. No. 4,198,037, this compressive force 'F' changes the spring-related properties of the elastomer and permits the body 20 thereafter to be used as a compression spring with elastic memory.

The result of the above-described application of force 'F' to produce a hollow body 20A having the advantages and characteristics of the present invention is illustrated in FIG. 3. The compression of the body 20 not only changes the physical characteristics of the polymer material, but it transversely and outwardly expands the core opening 22, to produce a generally toroidally shaped hollow body 20A having an enlarged symmetrical core 22A, as illustrated in FIG. 3. This hollow body 20A has different physical characteristics as compared to a solid body of the same elastic material subjected to the same compressive force. As also illustrated in FIG. 3, the resultant hollow body 20A has uniform sidewalls, and is symmetrical about its axial center line. The body 20A is thereby useful as a compression spring, a vibration dampener, an energy absorption cushion, or as a hollow rotary member, such as a wheel or the like.

FIG. 4 illustrates that the resulting hollow elastomer bodies, such as illustrated in FIG. 3, can be utilized to form a compression spring assembly in a freight and locomotive buffer 30. These buffers 30 are typically used between railway cars to buffer the impact of adjacent cars, and to compensate for the impact loads on the car couplers during operation of the freight train. To accomplish these purposes, the buffer 30 includes a housing 40 which has a flat rear mounting wall 42. The wall 42 is adapted to be mounted on a freight car in the desired location where the impact or shock energy must be absorbed by the buffer 30. Extending inwardly from the wall 42 is a central block 44 which supports a spring assembly 50. As described hereinbelow, the housing 40 is typically cylindrical, and preferably has an enlarged outer rim 46.

The buffer 30 also includes a sliding inner cylinder 60. This cylinder 60 is telescopically arranged within the housing 40, as shown in FIG. 4, and includes a striker head 62 at its outer end. The cylinder 60 is designed to slide within the housing 40 when the head 62 is impacted by a load from the adjacent freight car or the like. The energy of the impact is absorbed by the spring assembly 50. The spring assembly 50 is positioned within the telescoping cylinder 60 between the block 44 and the head 62. A spring follower plate 52 is provided at each end of the spring assembly 50 to control the application of force to the spring assembly.

Furthermore, the spring assembly 50 comprises a plurality of stacked, hollow elastomer spring members 54. The spring members 54, eight of which are included in the illustrated buffer 30, have been formed by the application of a compressive force to a hollow elastomer body as described above with respect to the spring member 20 shown in FIGS. 1 through 3. Each spring member 54 has an expanded central core opening 56 formed by the application of an axial force to the spring in accordance with this invention. Also, a plurality of pressure plates 58 are provided in the spring assembly 50 so that one plate 58 is positioned between adjacent spring members 54. These plates 58 assist in maintaining the spring members 54 in the proper stacked alignment during the operation of the buffer 30. As explained further in U.S. Pat. No. 4,198,037, the plates 58 can be provided with surface incongruities which will form a mechanical bond with the adjacent elastomer spring members 54.

The operation of the buffer 30 is apparent from the above description of the component parts. When a force load is applied to the head 62, such as by the impact between adjacent cars in a freight train, the force energy is cushioned and absorbed by the spring assembly 50. This energy absorption results from the fact that the force telescopes the cylinder 60 inside of the housing 40 and thereby compresses the spring assembly 50 axially. When the force is relieved, the spring assembly 50 will rebound and the head 62 will return to its initial position.

FIG. 5 illustrates a modified hollow body 70 produced in accordance with the present invention. The body 70 is generally cylindrical in configuration, and is provided with a central axial bore 72. The axial ends of the cylinder 70 define an upper end 74, and a lower end 76. In this modification, each of the ends 74 and 76 is provided with a projecting neck portion 74A and 76A. As seen in FIG. 5, the necks 74A and 76A project beyond the associated end walls 74 and 76, and are axially aligned with the central bore 72. These neck portions 74A and 76A can be formed on the cylindrical body 70 by machining, or can be molded into the body if the cylinder 70 is produced by a molding operation. In the illustrated embodiment, the neck portion 74A is axially longer than the neck portion 76A. Of course, these neck dimensions can be varied to accommodate the requirements of particular applications.

In FIG. 5 the cylindrical body 70 is shown positioned between a pair of compression jaws 'J' of a suitable compression device. The jaws 'J' include recesses for receiving and confining the neck portions 74A and 76A of the body 70. The jaws 'J' are thereby arranged to apply an axial compressive force to the body 70 without deforming the neck portions 74A and 76A. In accordance with this invention, the hollow body 70 is subjected to an axial compressive force which reduces the height of the body 70 by an amount equal to at least 30% of the initial body height. As explained further above, the cylindrical body 70 is thereby formed into a compressed hollow body 70A illustrated in FIG. 6. Since the jaws 'J' include recesses for the neck portions 74A and 76A, the neck portions of the resulting compressed hollow body 70A are unchanged. However, as seen in FIG. 6, the height of the body 70A is permanently reduced compared to the body 70 shown in FIG. 5. Moreover, the axial bore 72 provided in the body 70 has been symmetrically expanded about the axial center line to form an enlarged symmetrical core portion 72A. The compressed body 70A is thereby formed to have the characteristics and advantages of the present invention, and is further provided with axial neck portions 74A and 76A which facilitate the positioning and operation of the body 70A in particular industrial applications.

FIG. 7 illustrates the utilization of the compressed hollow body 70A, such as shown in FIG. 6, in a motor mount assembly. In this typical motor mount application, a spring compression unit is positioned to dampen or cushion the vibrational energy between a relatively rigid frame member 80, and a pair of mobile motor mount members 82A and 82B. The motor mount assembly must be capable of absorbing or dampening the vibrational energy in multiple directions, such as when the motor mount members 82 vibrate both upwardly and downwardly with respect to the rigid member 80 illustrated in FIG. 7. The motor mount assembly must also be capable of absorbing at least a minimum amount of horizontal vibrational energy.

To accomplish these purposes, a pair of hollow elastomer spring bodies 70A, such as illustrated in FIG. 6, are positioned in axial alignment in the motor mount assembly illustrated in FIG. 7. The hollow configuration for the bodies 70A allows the design parameters of the body to be varied to provide a spring rate which is sufficiently low to allow the use of the copolyester polymer elastomer material in many typical motor mounting or vibration dampening operations. One of the bodies 70A is positioned between the rigid frame 80 and the motor mount plate 82A, and the other body 70A is positioned between the frame 80 and the lower motor mount plate 82B. A bolt and nut assembly 84 extends through the enlarged axial bores 72A of the bodies 70A to maintain the bodies in axial alignment.

The rigid frame 80 includes an aperture 81, and the motor mount plates 82A and 82B include apertures 83, to position the bolt assembly 84 in the motor mount assembly. As seen in FIG. 7, the apertures 81 and 83 are dimensioned to receive within a close tolerance the neck portions 74A and 76A provided on each of the bodies 70A. The bolt assembly 84 passes through the neck portions 74A and 76A. The neck portions 74A and 76A thereby secure the bodies 70A in the proper axial position with respect to the frame 80 and the motor mount plates 82A and B. The different axial sizes of the neck portions 74A and 76A accommodate the axial lengths of the apertures 81, 83 into which the neck portions extend.

The bolt assembly 84 will thereby transmit vibrational forces to the hollow body members 70A in both the upward and downward vertical directions, as illustrated in FIG. 7. Thus, if an upward force is applied to the bolt assembly 84 by the motion of the motor and the plates 82, the motor mount plate 82B is urged upwardly, as viewed in FIG. 7. The plate 82B compresses the lower member 70A against the rigid frame 80, to thereby dampen the vibrational energy caused by the motion of the motor. Likewise, a downward vibratory force applied to the bolt 84 and the plate 82A compresses the upper hollow body members 70A against the rigid frame 80, to thereby absorb the vibrational energy of the motor motion. Furthermore, the positioning of the neck portions 74A and 76A within the apertures 81 and 83 permits the bodies 70A to absorb and react to lateral or torsional loads applied by non-vertical relative motion between the plates 82A and 82B and the rigid frame 80. The hollow bodies 70A will thus dampen the vibrational energy of the motion of the motor assembly by reacting to force components in the horizontal as well as the vertical direction. The vibration damping capabilities of the assembly will thus be significantly improved.

Figure 8:
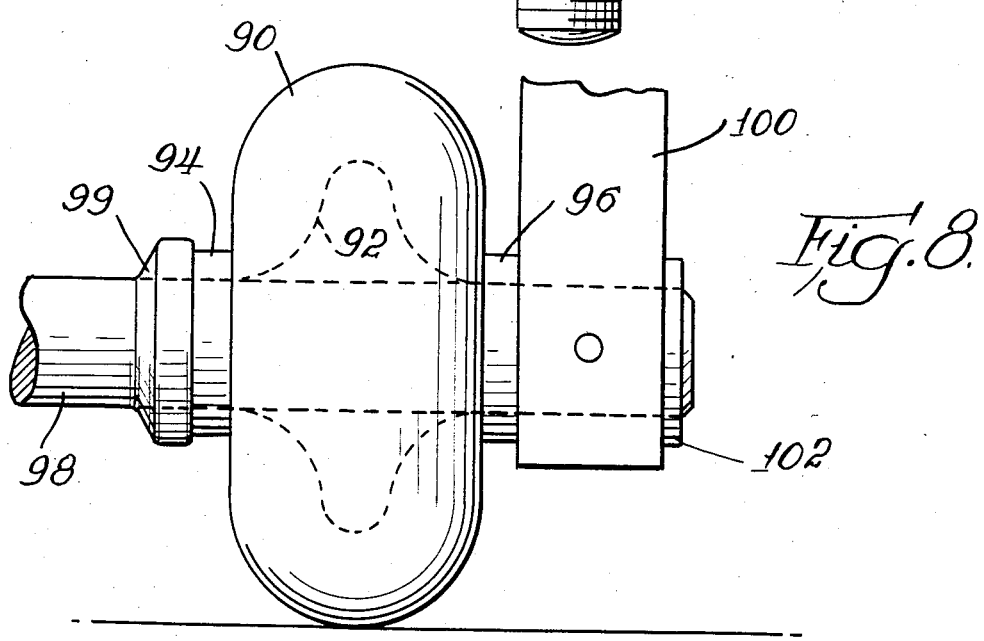
FIG. 8 is a partial view of a further embodiment of the present invention showing the hollow elastomer body used as a wheel.

FIG. 8 illustrates an application of the hollow bodies produced by the present invention which capitalizes upon the symmetry of the bodies. In FIG. 8 a hollow body 90, including an enlarged central core 92, is provided with neck or hub portions 94 and 96. The body 90 is similar to the hollow body 70A illustrated in FIG. 6, and can be produced to have the hub portions 94 and 96 in the same manner as described above with respect to the formation of the neck portion 74A and 76A on the hollow body 70A. The hub portions 94 and 96 on the body 90 facilitate the insertion of an axle shaft 98 into the central core 92 of the body, and through the hub portions. A flange 99 is provided on the shaft 98, as seen in FIG. 8, to bear against the hub portion 94 and restrain the wheel 90 from lateral movement to the left in FIG. 8. As also seen in FIG. 8, the right portion of the axle 98 is rotatively mounted in an appropriate aperture provided in the frame member 100. The frame 100 can be associated with a vehicle or other mobile apparatus such as a work cart or the like, on which the wheels 90 are used. A conventional retaining washer 102 can be provided to secure the axle 98 onto the frame 100 and to prevent the wheel 90 and the axle 98 from lateral movement with respect to frame 100. The symmetrical nature of the hollow bodies produced pursuant to this invention results in a generally light weight and smoothly operating wheel 90.

FIGS. 9–11 illustrate the use of the present invention in a formation of hollow bodies having shapes other than cylindrical. In FIG. 9 the original co-polyester polymer elastomer material is molded or machined to have an oval or ellipsoidal configuration. This oval elastomer body 110 is also provided with an oval central core opening 112. The core 112 is similar in shape to and co-axial with the body 110 to assure that the resulting compressed hollow body is symmetrical about its vertical axis. In the embodiment shown in FIGS. 9 and 10 the core 112 extends through the body 110.

FIG. 10 illustrates the configuration of the hollow body 110A after the above-described body 110 is subjected to the compressive force pursuant to this invention which reduces the initial axial height of the body 110 by at least 30%. The compressed hollow body 110A has an enlarged core 112A, and is provided with the enhanced spring characteristics as described above. FIG. 10 illustrates the symmetry that the body 110A and the hollow core 112A have with respect to the major axis of the oval body. The symmetry of the hollow body 110A and the central core 112A also exists in a similar fashion about the minor axis of the body.

The oval body 110A is usable as a compression spring in situations where the enlarged major axis may have some benefit, such as in a rectangular spring assembly. Of course, it will be appreciated by those skilled in the art that the shape or configuration of the hollow bodies and the internal cores can be varied to suit the particular industrial application.

FIG. 11 illustrates another modification of the invention where the oval body 110B is provided with a hollow core 112B that extends only partially through the body. The resulting body 110B has characteristics similar to the above-described body 110A, except that a solid end wall 113 is formed at one axial end of the body. This end wall 113 is useful in particular applications, such as when the body 110B is used as an energy absorption bumper. In such an application, the body 110B could be mounted on the vehicle, guard rail, or other structure in the desired position by securing a fastener, such as a bolt, to the end wall 113.

FIG. 12 illustrates the performance characteristics under dynamic and static testing conditions of a buffer 30 illustrated in FIG. 4, having the compression spring assembly 50 provided with rubber circular spring members having a central opening. The graph of FIG. 12 illustrates the travel, in millimeters, of the spring assembly 50 upon the application of a force, expressed in kilo-newtons, applied to the buffer head 62 to compress the stack of rubber springs. The solid line curve S in FIG. 12 represents the force-travel curve of the buffer when subjected to a static load applied at a standard rate of 25 millimeters of deflection per minute until full deflection occurred. The initial preload force was one kilo-newton, and the end force was 630 kilo-newtons. The area below the static compression curve S in FIG. 12 graphically illustrates the total energy ($W_e$) stored by the spring assembly 50 in a spring stroke of approximately 105 millimeters. In a typical static test, this energy ($W_e$) was nine kilo-joules for the rubber compression springs.

The force-travel curve D in FIG. 12 represents the force-distance curve generated by the application of a dynamic load to a buffer such as illustrated in FIG. 4, having the above described rubber compression springs. The dynamic load was applied by a 27,000 pound drop hammer impacting the head 62. Again, the area below the curve D in FIG. 12 graphically represents the total energy ($W_e$) stored by the rubber spring assembly through a spring stroke of approximately 105 millimeters. In a typical dynamic test for this type of buffer having rubber springs, the stored energy ($W_e$) was 18 kilo-joules. The end force was about 1325 kilo-newtons.

FIG. 13 represents graphically the same type of dynamic and static tests applied to a buffer 30 as shown in FIG. 4 which included a stack of hollow elastomer spring bodies 54 produced pursuant to the present invention. The solid line curve S in FIG. 13 represents the force-travel curve generated by the application of a static test load to the buffer 30, including the elastomer hollow bodies 54 by a screw-type loading device that deflected the spring at 25 millimeters per minute. As illustrated in FIG. 13, the maximum deflection of about 105 millimeters occurred at a force of 1050 kilo-newtons. The area under the curve S, representing the spring energy stored within the 105 millimeters deflection ($W_e$), was 32 kilo-joules in a typical test. In a similar manner, the broken line curve D illustrated in FIG. 13 represents the force-travel curve for the polymer spring assembly 50 under dynamic test conditions. The dynamic force was applied by the impact of a 27,000 pound drop hammer. The maximum dynamic loading of the polymer spring assembly, at a maximum deflection of 105 millimeters, was 1552 kilo-newtons. The area under the curve D, representing the energy ($W_e$) stored by the spring assembly 50, was approximately 50 kilo-joules in a typical dynamic test.

A comparison of FIGS. 12 and 13 establishes that the co-polyester polymer springs 54 have enhanced spring characteristics and energy absorption properties when used in a buffer such as shown in FIG. 4, as compared to rubber compression springs. Under both dynamic and static test conditions, the amount of force necessary to fully compress the spring assembly was substantially greater with the co-polyester polymer springs 54. Moreover, the energy ($W_e$) stored by the spring, was substantially greater with the co-polyester polymer compression springs 54. In the static tests, the energy stored increased by a factor of four from 9 to 32 kilo-joules. In the dynamic tests, the stored energy rose from 18 kilo-joules with rubber to 50 kilo-joules with the springs pursuant to this invention.

FIG. 14 illustrates additional features and characteristics of the hollow elastomer springs produced pursuant to the present invention. In FIG. 14, four load-deflection diagrams are presented for spring members which have varying physical characteristics. In each instance the cylindrical body is made from a block of copolyester polymer elastomer material having an outside diameter of 2.5 inches and an initial axial height of 3 inches. In each instance the elastomer pad was subjected to an axial compressive force which compressed the pad by 70% of its original height. The force was then released. The pad $P_1$ was a solid elastomer cylinder. After the compression force was released pad $P_1$ had a free height of 1.61 inches. The pad $P_2$ was provided with an axial bore having an initial internal diameter of $\frac{3}{4}$ of an inch. The free height of $P_2$ after the 70% compression force was 1.64 inches. The pad $P_3$ was provided with an initial internal axial bore having an internal diameter of 1 inch. The resulting free height after compression of pad $P_3$ was 1.78 inches. Finally, the pad $P_4$ was provided with an initial axial bore having an internal diameter of $1\frac{1}{4}$ inches. The resulting free height of the pad $P_4$ was 2.18 inches.

The load-deflection curves illustrated in FIG. 14 demonstrate the versatility of the springs using this invention by depicting the different characteristics of the elastomer bodies provided with the different sized hollow cores. These load-deflection curves were generated by loading the final pads $P_1$–$P_4$ with a static load to produce a deflection of 25 millimeters per minute.

A comparison of the curves shown in FIG. 14 shows the effect of providing for and varying the diameter of a central core in the hollow elastomer body pursuant to this invention. As the core is provided and increases in size, such as illustrated by progressing from the pad $P_1$ through the pad $P_4$, the deflection for a given force substantially increases. Stated alternatively, the force needed for full deflection substantially decreases. The various pads $P_2$ through $P_4$ are thereby provided with substantially different spring rates (i.e., the ratio of load to deflection). The energy ($W_e$) stored by the springs during maximum deflection also varies. The $W_e$ for the solid pad $P_1$ was measured to be approximately 13,300 inch-pounds; for $P_2$ the $W_e$ value was about 9500 inch-pounds; for $P_3$ the value was about 8000 inch-pounds; and for $P_4$ the value was about 6900 inch-pounds.

Accordingly, the present invention allows a pad of thermoplastic elastomeric material to be easily modified to change the spring characteristics of the pad to meet the design requirements of particular industrial applications. The versatility of the invention thereby gives the designer the capability of custom-designing a spring to have a particular spring rate and/or energy storage capacity within a given space envelope.

The various embodiments of the invention are set forth above by way of example. It will be appreciated by those skilled in the art that modifications can be made to the method and apparatus of this invention without departing from the spirit and scope of the invention as set forth in the accompanying claims.

What is claimed is:

1. A method of producing a hollow body from a copolyester polymer elastomer material comprising the steps of:
    providing a block of said copolyester polymer elastomer having a selected initial axial length and transverse shape and further having an initial core opening extending axially substantially through said block, said material and said opening being uniform in cross-sections perpendicular to a central axis, said material being such that upon being axially compressed at least 30% of said initial axial length the material will permanently retain a substantial portion of the length reduction after being compressed;
    applying to said block having said cross-sections an axial force sufficient to compress said block at least 30% of its initial axial length to change the transverse shape of said block such that the configuration of said core opening is permanently expanded transversely outwardly to define sidewalls for the hollow body of a selected configuration; and
    removing said axial force from said block.

2. A shock and vibration isolator produced by the method of claim 1.

3. A method of making a compression spring unit employing the hollow body produced by the method as set forth in claim 1 and having a pair of pressure plates positioned on the axial ends of said compression springs, said method comprising the further steps of:
    providing said plates with means to mechanically join said plates to said hollow body;
    positioning said plates on the axial ends of said hollow body with the joining means in engagement with said body;
    said axial force causing said elastomer material to flow and form a mechanical bond between said body and said plates.

4. A compression spring unit produced by the method of claim 1.

5. A method of making a multiple unit compression spring assembly employing a plurality of hollow bodies produced by the method as set forth in claim 1 comprising the further steps of;
    providing a plurality of pressure plates having means to mechanically join said plates to adjacent hollow bodies;

placing a plurality of said hollow bodies in axial alignment in a stack, with one of said plates positioned between each adjacent hollow body and the joining means on said plates in engagement with the associated hollow bodies;

said axial force causing the elastomer material comprising said hollow bodies to flow and form a mechanical bond between said bodies and the engaged pressure plates.

6. A multi-unit compression spring assembly produced by the method of claim 5.

7. A method of making a compression spring member comprising the steps of:

providing a block of thermoplastic elastomer material having a selected initial axial length and transverse shape and further having an initial core opening extending substantially through said block, the material and said opening being uniform in cross-sections perpendicular to a central axis, said material being such that upon being axially compressed at least 30% of said initial axial length the material will permanently retain a substantial portion of the length reduction after being compressed;

applying an axial force sufficient to compress said block, having said uniform cross-sections, at least 30% of its initial axial length to change the transverse shape of said block such that the configuration of said core opening is permanently expanded transversely outwardly to thereby provide a hollow compression spring member having sidewalls of a selected configuration; and removing said axial force from said block.

8. A method in accordance with claim 1 or claim 7 wherein the core opening extends partially through the block of elastomer material.

9. A method in accordance with claim 1 or 7 wherein the core opening extends axially through the block of elastomer material.

10. A method in accordance with claim 7 wherein said material comprises a copolyester polymer elastomer material.

11. A method in accordance with claim 1 or 7 wherein said axial force is sufficient to compress said block in the range of about 30% to 80% of its initial axial length.

12. A method in accordance with claim 11 wherein said axial force compresses said block to about 50% of its initial axial length.

13. A method in accordance with claim 1 or 7 wherein said core opening is formed by boring an opening having a selected diameter axially into said block.

14. A method in accordance with claim 1 or 7 wherein said core opening is providing by molding an axially extending opening in said block.

15. A method in accordance with claim 1 or 7 including the step of forming at one end of said block a neck portion centrally positioned with respect to said core opening and having a selected axial extent and a transverse extent reduced with respect to said transverse shape of said block.

16. A method in accordance with claim 15 including the step of forming said neck portion at both ends of the block.

17. A method in accordance with claim 1 or 7 wherein said core opening is centrally located with respect to said block to provide sidewalls which are substantially uniform and symmetrical with respect to the axis of said hollow body.

18. A method in accordance with claim 17 wherein said transverse shape of said block defines an external surface similar to and co-axial with said core opening.

19. A method in accordance with claim 18 wherein said transverse shape of said block and said core opening are circular so that said hollow body will be generally toroidal into configuration.

20. A wheel produced by the method of claim 19.

21. A compression spring produced by the method of claim 7.

22. An energy absorption bumper produced by the method of claims 1 or 7.

23. A compression spring member comprising a body of thermoplastic elastomeric material having a selected transverse configuration and axial free height and transversely expanded hollow central core opening extending substantially therethrough, the material and said opening being uniform in cross-sections perpendicular to a central axis, said material being such that upon being axially compressed at least 30% of said initial axial length the material will permanently retain a substantial portion of the length reduction after being compressed, defined by axially compressing said body having the uniform said core opening, by an extent equal to at least thirty percent of the initial height of he uncompressed elastomeric material such that the configuration of the core opening is permanently expended transversely outwardly.

24. A spring member in accordance with claim 23 wherein said material is a copolyester polymer elastomer material.

25. A spring member in accordance with claim 23 wherein said hollow core is similar to and co-axial with respect to the transverse configuration of said body so that said hollow body is generally symmetrical about its axis.

26. A spring member in accordance with claim 23 wherein said block is formed with a neck portion axially aligned with said core on at least one axial end of said block and extending axially from said end and adapted to absorb lateral and torsional forces applied to said spring.

27. A spring in accordance with claim 26 wherein a neck portion is provided on both axial ends of said block.

28. A method of producing an elastomeric compression spring having a selected spring rate comprising the steps of:

providing a block of copolyester polymer elastomer material having a selected initial axial height and transverse configuration, said material being such that upon being axially compressed at least 30% of said initial axial length the material will permanently retain a substantial portion of the length reduction after being compressed forming a core opening in said block extending axially substantially therethrough and having a transverse size selected to define sidewalls which provide said selected spring rate, the material and said opening being uniform in cross-sections perpendicular to a central axis;

applying to said block having said core opening an axial force sufficient to compress said block at least 30% of said initial axial height such that the configuration of said core opening is permanently expanded transversely outwardly to define said sidewalls; and removing said axial force from said block to thereby provide said compression spring.

29. A method in accordance with claim 28 wherein said core is formed in said block to extend axially therethrough.

30. A method in accordance with claim 28 wherein an end wall is formed in said spring by extending said core opening only partially through said block.

31. A method of producing a spring in accordance with claim 28 including annealing said block before the application of said compressive force thereto.

32. A vibration dampening system for use as a motor mount or the like comprising:

first mounting means defining a relatively rigid frame structure;

second mounting means defining a relatively movable frame structure adapted to be connected to the source of vibration energy to be dampened; and a pair of hollow compression spring members positioned between said first and second mounting means and arranged to be compressed to thereby dampen the vibratory motion between said mounting means;

each of said hollow spring members comprising a body of thermoplastic material having a hollow central core opening extending substantially therethrough, said material and said opening being uniform in cross-sections perpendicular to a central axis, said material being such that upon being axially compressed at least 30% of said initial axial length the material will permanently retain a substantial portion of the length reduction after being compressed, and defined by axially compressing said body with the uniform core opening of an initial configuration by an extent equal to at least 30% of the initial uncompressed height of said body to permanently set the body and to permanently change the hollow central core opening from its initial configuration to a permanent expanded configuration.

33. A system in accordance with claim 32 wherein said bodies are formed from copolyester polymer elastomeric material.

34. A system in accordance with claim 32 or 33 wherein said bodies are provided with axially extending neck portions which engage with said mounting means and dampen the lateral and torsional motion between said mounting means.

* * * * *